Sept. 7, 1954
J. R. HAYES
2,688,190
ACETYLENE CUTTING TORCH COMPASS
Filed May 6, 1950
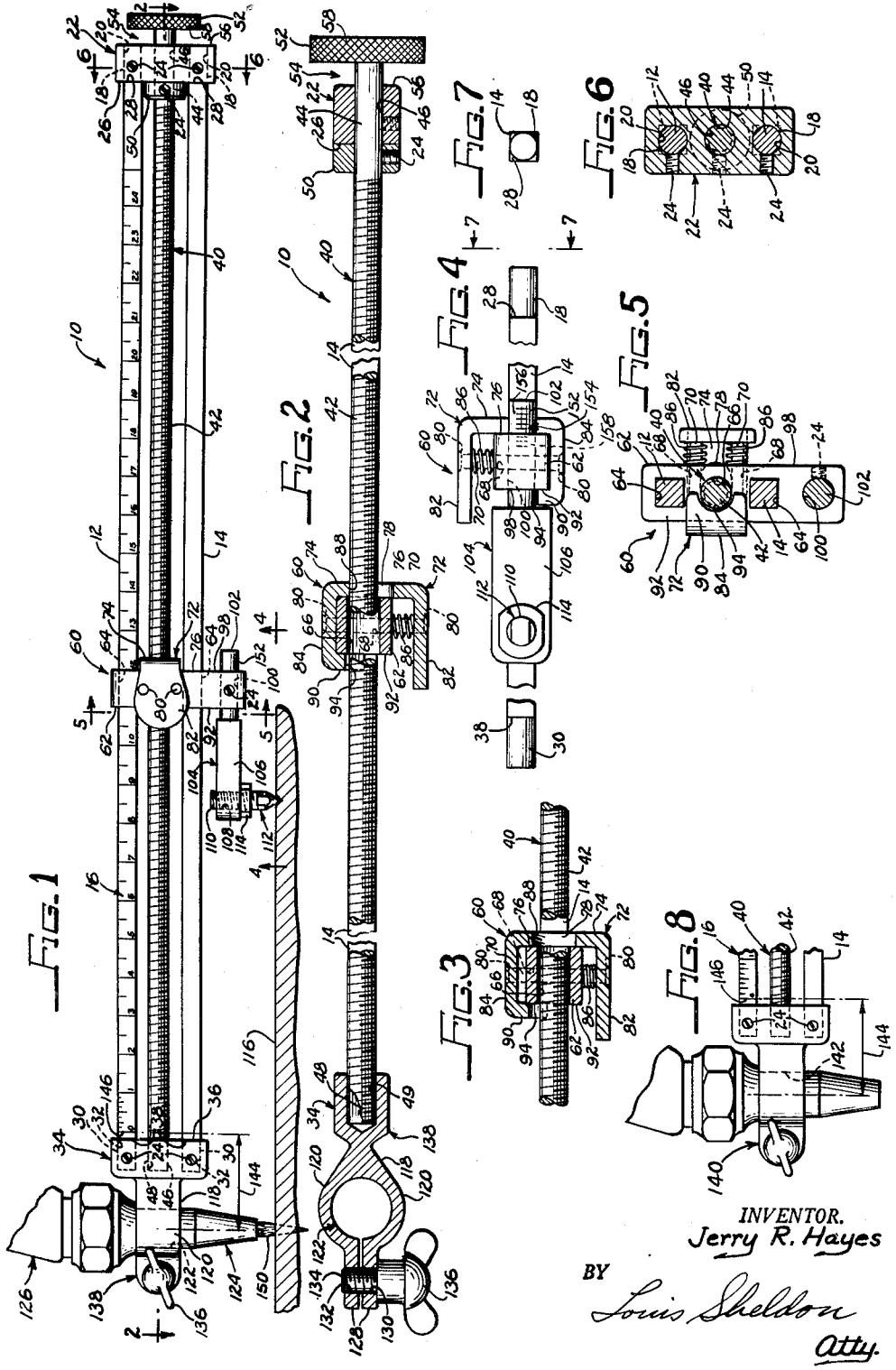
INVENTOR.
Jerry R. Hayes
BY
Louis Sheldon
Atty.

Patented Sept. 7, 1954

2,688,190

UNITED STATES PATENT OFFICE 2,688,190

ACETYLENE CUTTING TORCH COMPASS

Jerry R. Hayes, Lombard, Ill.

Application May 6, 1950, Serial No. 161,920

2 Claims. (Cl. 33—27)

This invention relates to acetylene cutting torch compasses for use in cutting circular holes and plates.

It is an object of the invention to provide a compass of the character referred to which is capable of rapid radius adjustment.

Another object is to provide a compass of the character referred to which is capable of both fine and rapid radius adjustment.

A further object is to provide a circle cutting torch compass having means for rendering the cutting tip holder replaceable to enable welding tips of different diameters to be used with the compass.

An additional object is to provide a cutting torch compass including a slider enabling the center-point to be adjusted relative to the slider to compensate for the width of the circle cut.

It is also an object to provide a cutting torch compass in which the center-point is adjustable along its own axis.

A further object is to provide a cutting torch compass having a slidable center-point support and means for automatically and fixedly retaining the point in the desired adjustment longitudinally of the compass.

It is also an object to provide a knock-down acetylene cutting torch compass enabling certain parts to be readily replaced by longer parts to form a compass capable of describing larger circles.

Further objects and advantages of the invention will appear as the description proceeds.

The invention will be better understood upon reference to the following description and accompanying drawing, in which:

Fig. 1 is an elevational view of an acetylene cutting torch compass embodying features of my invention.

Fig. 2 is an enlarged view, partly in section and partly in elevation, taken as indicated by the line 2—2 in Fig. 1.

Fig. 3 is a view similar to the portion of Fig. 2 including the slider, but with the latter released to enable it to be slid.

Fig. 4 is an enlarged bottom plan view taken as indicated by the line 4—4 in Fig. 1.

Fig. 5 is an enlarged sectional view taken as indicated by the line 5—5 in Fig. 1.

Fig. 6 is an enlarged sectional view taken as indicated by the line 6—6 in Fig. 1.

Fig. 7 is an end elevational view taken as indicated by the line 7—7 in Fig. 4.

Fig. 8 is a view similar to the left end portion of Fig. 1 but shows a different tip holder accommodating a tip of different diameter.

Referring now more particularly to the drawing, showing an illustrative embodiment of the invention, there appears generally at 10 an acetylene cutting torch compass comprising a pair of parallel bars 12 and 14, one of which preferably is half-scaled in inches as shown (on a reduced scale) at 16, i. e., every actual half inch is noted as an inch, so that the diameter of the circle to be cut is directly readable more or less accurately, as will appear, on said scale. The bars 12 and 14 may be otherwise identical and have at one end cylindrical terminals 18 slidably fitting in holes 20 formed in a connecting and spacing end block 22 provided with Allen or other set screws 24 for engaging the terminals, the inner face 26 of the block being engageable with the bar shoulders 28 at the inner ends of the terminals. The bars 12 and 14 have at the other ends cylindrical terminals 30 slidably fitting in sockets 32 formed in a second connecting and spacing block 34 in which said terminals are likewise adapted to be held by Allen or other set screws 24, the inner face 36 of said block being engageable with the bar shoulders 38 at the inner ends of said terminals. When connected together, the bars 12 and 14 and the blocks 22 and 34 form a rigid rectangular frame.

An adjusting screw 40 has a threaded stem or shank 42 substantially co-extensive with and between the bars 12 and 14, with one terminal 44 smooth and journaled in a hole 46 in the end block 22, and its other terminal 48 journaled in a hole 49 in the other end block 34. A collar 50 is freely movable along the shank 42 without threaded engagement therewith and is secured about the shank short of its terminal 44 by an Allen or other set screw 24 and slidably engages the inner face 26 of the block 22. The adjusting screw 40 has a head 52 somewhat spaced, as indicated at 54, from the outer face 56 of the block 22, said head being preferably knurled as indicated at 58 to serve as a knob for facilitating manual rotation of the screw, without frictional resistance between the knob and block. The shank terminal 44 preferably slightly exceeds the threaded portion in diameter, enabling the shank 42 to pass through the end block 22.

A slider, generally indicated at 60, is provided to move along the bars 12 and 14 and the adjusting screw 40, and comprises a block 62 having holes 64 through which the bars slidably but non-rotatably pass and an intermediate hole 66 through which the adjusting screw shank 42 passes freely. The block 62 has in addition two parallel holes 68 between the screw shank and the respective bars 12 and 14, and in said holes are slidably disposed two pins 70. A generally C-shaped strap 72 is arranged with its web 74 in substantially sliding engagement with a face 76 of the block 62, the web having a slot 78 through which the adjusting screw shank 42 is adapted under certain circumstances, as will appear, to pass freely. The ends of the pins 70 are riveted as at 80 or otherwise suitably made fast to the arms 82 and 84 of the strap 72, and compression springs 86 are coiled about said pins between the slider block 62 and the arm 82, constantly urging the strap toward the relative position shown in Figs. 2, 4 and 5. The end 88 of the slot 78 is threaded and, when the springs 86 are expanded, is in threaded engagement with the adjusting screw shank 42 (Fig. 2). The strap arm 82 may be pressed by the operator's thumb to compress the springs 86 and thereby release the strap 72 from threaded engagement with the screw shank 42. It is accordingly apparent that when the springs 86 are compressed, the slider 60 may be freely and quickly moved along and substantially throughout the length of the bars 12 and 14 independently of the screw shank 42, and that, when the pressure on the springs is completely relaxed, the springs will expand and effect threaded engagement between the strap and the screw shank, so that the slider 60 will be securely held in fixed relation to the bars. The operator may be content with the adjustment thus effected, but, should he desire a closer or finer adjustment, that may be effected by rotation of the knob 52 in the proper direction. The strap arm 84 preferably has a lip 90 opposite the web 74 to slidably engage the opposite face 92 of the slider block 62, and the lip may have a notch 94 freely receiving the screw shank 42.

The slider block 62 has an extension 98 having a hole 100 therethrough in which is slidably received the stem 102 of a pin 104 adapted to be held in a suitable adjustment in the block by means of an Allen or other set screw 24, for a purpose which will appear. The pin 104 has a head 106 having a tapped hole 108 in which the threaded stem 110 of a center-point 112 is received, a nut 114 being engaged with said stem and engageable with the pin head to retain the point in any of various adjustments relative to the head, such as may be required when longer or shorter tips are used, so that the bars 12 and 14 may extend parallel to the workpiece 116 in the interest of accuracy.

The block 34 has an extension 118 with a pair of arms 120 defining a cylindrical hole 122 for embracing the cutting tip 124 of an acetylene cutting torch 126, said arms having spaced jaws 128 with registering holes 130 and 132, the latter being tapped for threaded engagement with the threaded shank 134 of a thumb screw 136 for tightly and releasably clamping said arms about the tip, the entire holder including the block being generally indicated at 138.

The conventional acetylene cutting torch compass tip holder is integral with the body of the compass and is adapted to accommodate only one size of tip so that, when a tip of a larger or smaller diameter is to be used, a different complete compass must be provided. With my invention, however, the tip holder 138 may be removed and replaced by another tip holder, one of which is shown at 140 (Fig. 8), having a hole 142 of a size to accommodate the differently sized tip. This may be done simply by removing the two set screws 24 connecting the tip holder 138 to the terminals 30 of the bars 12 and 14, pulling off the holder, slipping the appropriate interchangeable holder, for example the holder 140, onto said bar terminals and the adjusting screw shank terminal 48, and replacing the set screws. The various interchangeable tip holders are made so that the axes of the tip-receiving holes thereof are the same predetermined distance 144 from the inner faces of the holders, so that, regardless which tip holder is mounted on the bars, the axis of the tip will in all cases be the same distance from the zero mark 146 on the scale 16.

The face 92 of the slider block 62 cooperates with the scale 16 to measure twice the distance between the axis of the flame 150 and the axis of the center-point 112. This measurement may be accurate or approximate, depending on the adjustment of the stem 102, which is scaled at 152 adjacent the face 76 of the slider block 62. A circle of approximately a given diameter will be cut when the slider block 62 indicates the given diameter on the frame scale and the face 76 of the slider block 62 indicates the neutral or zero mark 154 on the pin scale 152. With these adjustments made, the outside diameter of the circular cut will exceed that indicated on the frame scale 16 by the width of the cut, and the inside diameter of the cut will be less than the indicated diameter by the width of said cut. When it is desired to cut a hole whose diameter is to be indicated with precision on the compass scale 16, the slider 60 is moved to indicate the preselected diameter on said scale, and the center-point supporting pin 104 is adjusted so that the appropriate one of the marks 156 on the scale 152, at the right (Fig. 1) of the neutral mark 154, is indicated by the slider block 62, the marks 156 being appropriately enumerated according to the width of cut produced by the flame, which, of course, will depend on the size of tip used, to thereby compensate for the width of the cut. Likewise, when a plate is to be cut with an accurate outside diameter, the slider 60 is moved to the point at which it indicates that precise outside diameter on the compass scale 16, and the center-point holder stem 102 is adjusted in the opposite direction to that last considered, so that the appropriate one of the marks 158 at the left (Fig. 1) of the neutral point 154 on the stem scale 152, is indicated by the slider block 62, the marks 158 being appropriately enumerated according to the width of cut produced by the flame of the particular size of tip employed. With any one tip holder, of course only one mark 156 and one mark 158, both equidistant from the neutral mark 154, will be used.

Should it be desired to provide a compass of greater length than the one then in use, to enable a torch to cut larger circles, it is necessary merely to loosen the set screws 24 on the end blocks 22 and 34 and the collar 50 and compress the slider springs 86 and remove the bars 12 and 14 and the screw 40, and assemble the other parts with new bars and a screw of the desired length. In the conventional torch compass a completely new compass is required in order to cut circles of greater diameter than the maximum afforded by another such compass.

In view of the foregoing, it is apparent that I have provided a simple compass construction which is convenient to use, affording few parts which are readily assembled and disassembled and accessible for attention and replacement, and easily and quickly adjustable, enabling various tip holders to be interchangeably employed and also enabling the compass, through the easy replacement of the screw and bars by longer ones, to cut circles of greater diameters. The device is compact and embodies parts which may be readily manufactured at low cost.

Various modifications may suggest themselves to those skilled in the art without departing from the spirit of my invention. Hence I do not wish to be restricted to the specific forms shown or uses mentioned, except to the extent indicated in the appended claims.

I claim:

1. An acetylene cutting torch compass comprising a substantially rigid elongated rectangular frame, a screw whose shank is disposed between and parallel to the sides of and journaled in the ends of said frame, means confining said screw to rotary motion relative to said frame, said screw having a knob disposed outside of said frame to facilitate manual rotation of said screw, a slider slidably connected to said frame for movement longitudinally of said frame, a center-point carried by said slider, the frame end remote from said knob having a socket for holding a cutting torch tip, said frame having a longitudinal scale, said slider having a portion cooperating with said scale to indicate the distance between the axes of said socket and center-point, means for releasably threading said slider to said shank, means enabling said centerpoint to be adjusted toward and away from said frame, means enabling said centerpoint to be adjusted relative to said slider toward and away from said socket axis to compensate for the width of cut produced by the tip flame according as the torch is to cut a hole whose diameter is measured accurately by said scale or a circle whose outside diameter is measured accurately by said scale, and means for indicating the extent of the latter adjustment of said center-point.

2. An acetylene cutting torch compass comprising an elongated rectangular frame, a screw whose shank is disposed between and parallel to the sides of and journaled in the ends of said frame, means confining said screw to rotary motion relative to said frame, a slider slidably connected to said frame for movement longitudinally of said frame, a center-point carried by said slider, one end of said frame being readily removable and having a socket for holding a cutting torch tip, said frame having a longitudinal scale, said slider cooperating with said scale to indicate the distance between the axes of said socket and center-point, means for releasably threading said slider to said shank, means enabling said center-point to be adjusted relative to said slider toward and away from said socket axis to compensate for the width of cut produced by the tip flame according as the torch is to cut a hole whose diameter is measured precisely by said scale or a circle whose outside diameter is measured precisely by said scale, and means for indicating the extent of adjustment of said center-point, said socketed frame end being readily replaceable by another frame end whose tip-holding socket is of a size to accommodate a tip of different diameter.

References Cited in the file of this patent

UNITED STATES PATENTS

| Number | Name | Date |
| --- | --- | --- |
| 365,031 | Traut | June 14, 1887 |
| 764,937 | Friedman | July 12, 1904 |
| 895,026 | Jottrand et al. | Aug. 4, 1908 |
| 1,351,846 | Forster | Sept. 7, 1920 |
| 1,495,994 | Farmer | June 3, 1924 |
| 1,590,651 | Schustarich | June 29, 1926 |
| 1,829,592 | Hasse | Oct. 27, 1931 |
| 2,202,133 | Young | May 28, 1940 |
| 2,323,298 | Cook | July 6, 1943 |
| 2,489,061 | Thompson | Nov. 22, 1949 |

FOREIGN PATENTS

| Number | Country | Date |
| --- | --- | --- |
| 33,589 | Switzerland | June 5, 1905 |